(12) United States Patent
Petersen

(10) Patent No.: US 9,944,211 B2
(45) Date of Patent: Apr. 17, 2018

(54) SEED CARRIER WITH PIVOTING CONVEYOR

(71) Applicant: UNVERFERTH MANUFACTURING COMPANY, INC., Kalida, OH (US)

(72) Inventor: Brian James Petersen, Ottawa, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 233 days.

(21) Appl. No.: 14/711,270

(22) Filed: May 13, 2015

(65) Prior Publication Data
US 2016/0297628 A1 Oct. 13, 2016

Related U.S. Application Data

(60) Provisional application No. 62/144,150, filed on Apr. 7, 2015.

(51) Int. Cl.
*B60P 1/36* (2006.01)
*A01C 15/00* (2006.01)

(52) U.S. Cl.
CPC .............. *B60P 1/36* (2013.01); *A01C 15/003* (2013.01)

(58) Field of Classification Search
CPC .... B60P 1/36; B60P 1/48; B60P 1/483; B60P 1/486; A01C 15/003; B65G 41/007; B65G 67/02; B65G 67/08
See application file for complete search history.

(56) References Cited

U.S. PATENT DOCUMENTS

| 5,011,025 | A  | * | 4/1991  | Lacey ..................... B07B 13/04 |
|           |    |   |         | 209/618 |
| 6,296,435 | B1 | * | 10/2001 | Wood ........................ B60P 1/42 |
|           |    |   |         | 198/536 |
| 7,267,519 | B2 | * | 9/2007  | Cresswell ............ A01C 15/006 |
|           |    |   |         | 198/313 |
| 8,221,047 | B2 |   | 7/2012  | Petersen |
| 8,479,911 | B2 | * | 7/2013  | Friesen ................ B65G 41/002 |
|           |    |   |         | 198/313 |

(Continued)

*Primary Examiner* — Anna M Momper
*Assistant Examiner* — Ashley K Romano
(74) *Attorney, Agent, or Firm* — Rothwell, Figg, Ernst & Manbeck, P.C.

(57) ABSTRACT

A seed carrier includes a frame and a main hopper mounted to the frame. The seed carrier also includes a support arm extending upwardly in relation to the frame, the support arm having a first end and a second end. The seed conveyor also includes a conveyor coupled to the support arm, the conveyor having an intake end and a discharge end and being pivotable relative to the support arm between a self-loading position and an unloading position. The conveyor also includes a main conveyor having a lower end and an upper end and an intake conveyor pivotally connected to the lower end of the main conveyor. The conveyor also includes a lift-assist assembly coupled between the main conveyor and the intake conveyor, the lift-assist assembly applying a force with an upward component to the intake conveyor at a position spaced from the pivot, whereby the weight of the intake conveyor is counterbalanced so as to render the intake conveyor manually pivotable. The conveyor also includes a latch mechanism coupled to at least one of the intake conveyor and the main conveyor.

28 Claims, 13 Drawing Sheets

(56) References Cited

U.S. PATENT DOCUMENTS

| | | | |
|---|---|---|---|
| 8,701,868 B2 * | 4/2014 | Hall ................... | A01D 87/00 |
| | | | 198/313 |
| 8,876,456 B2 * | 11/2014 | Kowalchuk ............ | A01D 87/00 |
| | | | 198/314 |
| 8,967,940 B2 | 3/2015 | Petersen | |
| 2002/0175055 A1 * | 11/2002 | Ryde .................... | B65G 15/34 |
| | | | 198/847 |
| 2013/0149091 A1 * | 6/2013 | Friggstad ............... | B60P 1/36 |
| | | | 414/523 |

\* cited by examiner

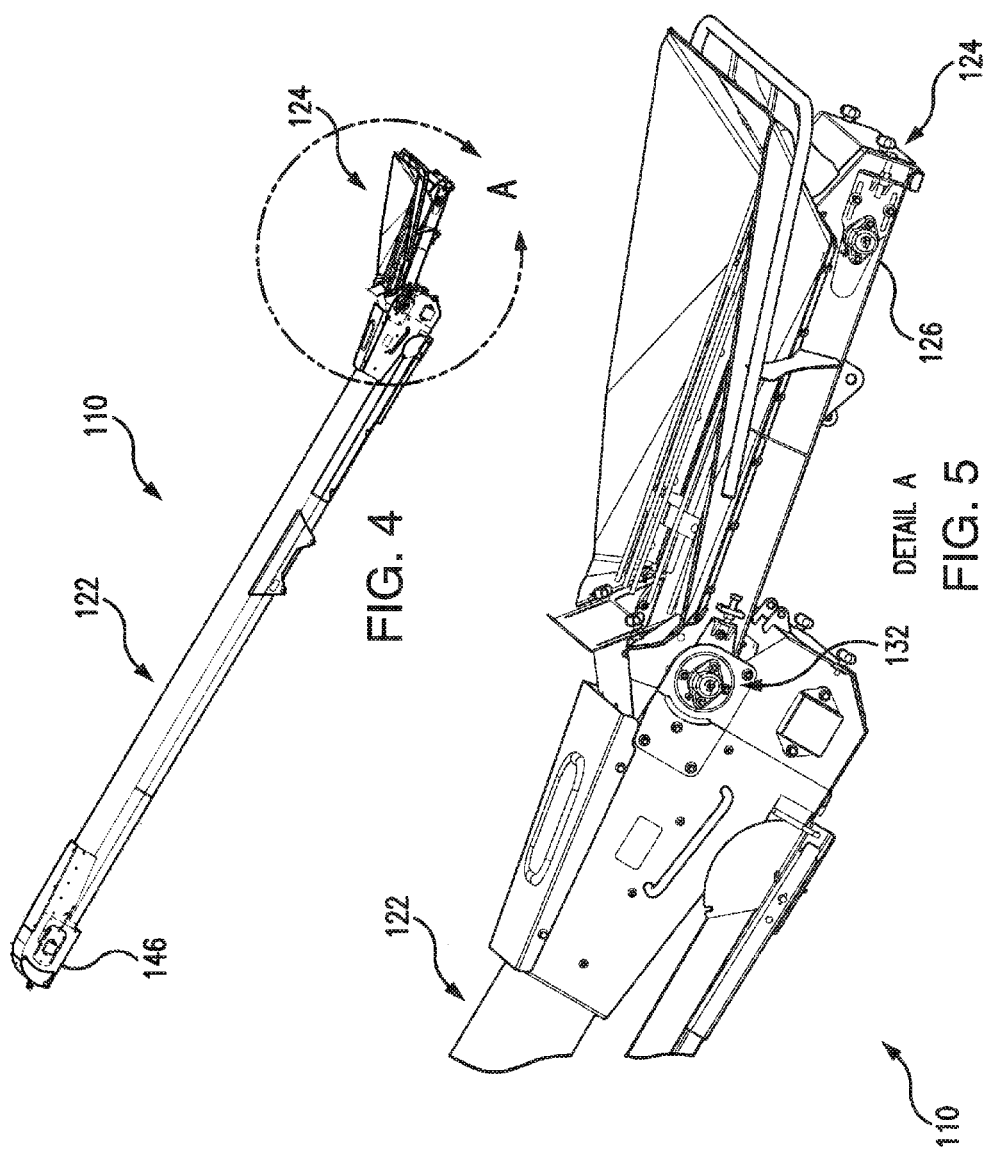

DETAIL A

DETAIL A

SEED CARRIER WITH PIVOTING CONVEYOR

CROSS-REFERENCE TO RELATED APPLICATIONS

This application claims priority to U.S. Provisional Patent Application Ser. No. 62/144,150, filed on Apr. 7, 2015, the disclosure of which is incorporated herein by reference in its entirety.

BACKGROUND OF THE INVENTION

Field of the Invention

The present invention relates to the field of seed carriers and, more particularly, to a seed carrier with a pivoting conveyor.

Description of the Background Art

Seed carriers, also referred to as seed tenders, are used by farmers to transport seed in bulk from one location to another during agricultural operations. For example, a seed carrier may be used during planting season to transport seed from a delivery truck to the field for delivery to planters and seed drills. Seed carriers typically include a storage bin or container mounted on wheels or tracks so that the seed carrier can be towed behind a tractor, and a conveyor for unloading seed from the container into another implement, such as a planter or seed drill. Recently, a new type of seed carrier was introduced in which the conveyor is movable about a pivot joint between a self-loading position and an unloading position. See U.S. Pat. No. 8,221,047, the disclosure of which is incorporated herein by reference in its entirety. The conveyor in this new type of seed carrier includes an intake end with a hopper and a discharge end. In the self-loading position, the intake end is spaced away from the container to receive seed from a delivery truck or storage bin and the discharge end is located above the container to dispense the seed into the container. In the unloading position, the intake end is located beneath the container to receive seed from the container and the discharge end is spaced away from the container to dispense the seed into a planter, drill, or some other farm implement disposed alongside or near the seed carrier.

SUMMARY OF THE INVENTION

The present invention expands the functionality of a seed carrier by providing a main conveyor pivotable at or near its center of gravity between self-loading and unloading positions and an intake conveyor pivotable upwardly and downwardly at the lower end of the main conveyor. The pivoting intake conveyor permits the carrier to receive seed directly from a semi-trailer with a low-profile discharge without the need for a separate, stand-alone conveyor of some kind to move that seed. With the use of this intake conveyor on the seed carrier, it is possible to use that one conveyor coupled to the seed carrier to both transfer the grain into the seed carrier, and also to discharge the seed from the seed carrier into a planter.

The present invention may also include a lift-assist to counterbalance the weight of the intake conveyor so that the angle of the intake conveyor may be manually adjusted by an operator.

The present invention may also include a latch mechanism for locking the intake conveyor in a desired angular orientation relative to the ground, such as a horizontal or nearly horizontal orientation, even when the main conveyor is oriented at a steeper angle.

The present invention may also include an adjustable baffle or gate for metering the amount of material transferred from the intake conveyor to the main conveyor to account for differences in capacity due to angular orientation of the intake and main conveyors.

The present invention may also include a system for automatically maintaining the intake conveyor at a desirable angular orientation when the conveyor is in an unloading position.

In another aspect of the present invention, a seed carrier includes a frame and a main hopper connected to the frame. The seed carrier also includes a support arm extending upwardly in relation to the frame, the support arm having a first end and a second end. The seed carrier also includes a conveyor coupled to the support arm, the conveyor having an intake end and a discharge end and being pivotable relative to the support arm between a self-loading position and an unloading position. The conveyor also includes a main conveyor having a lower end and an upper end and an intake conveyor pivotally connected to the lower end of the main conveyor. The conveyor also includes a lift-assist assembly coupled between the main conveyor and the intake conveyor, the lift-assist assembly applying a force with an upward component to the intake conveyor at a position spaced from the pivot, whereby the weight of the intake conveyor is counterbalanced so as to render the intake conveyor manually pivotable. The conveyor also includes a latch mechanism coupled to at least one of the intake conveyor and the main conveyor.

In an embodiment, the latch mechanism is coupled to the intake conveyor and the main conveyor via the lift-assist assembly. In an embodiment, the latch mechanism includes a latch movable between an engaged position wherein the latch engages the lift-assist assembly to maintain the intake conveyor in a desired orientation relative to the main conveyor and a disengaged position wherein the latch is disengaged from the lift-assist assembly so that the intake conveyor can pivot relative to the main conveyor. In an embodiment, the main conveyor includes an elongate tubular housing having an intake end and a discharge end and a main belt conveyor assembly disposed within the elongate tubular housing. In an embodiment the intake end of the housing is disposed above the lower end of the main conveyor in communication with the intake conveyor, the main belt conveyor assembly including main conveyor rollers at the upper and lower ends of the housing and a continuous main conveyor belt looped around the main conveyor rollers. In an embodiment, the intake conveyor includes a tray pivotally coupled to the lower end of the main conveyor, an intake belt conveyor assembly disposed within the tray, and an intake hopper. In an embodiment, the intake conveyor is pivotally coupled to the main conveyor via intake pivots at the lower end of the main conveyor, and the intake belt conveyor assembly includes intake rollers proximate the lower end of the main conveyor and at a distal end of the tray and a continuous intake belt is looped around the intake rollers. In an embodiment, the intake belt and the main conveyor belt include surface features, and wherein the surface features of the intake belt are smaller than the surface features of the main conveyor belt. In an embodiment, the intake belt and the main conveyor belt include surface features, and wherein the surface features of the intake conveyor belt are shorter and more closely spaced than surface features on the main conveyor belt. In an embodiment, the intake belt includes one or more of a crescent belt having a pattern of crescent-shaped ribs disposed at spaced intervals across a length and a width of the intake belt and chevron-shaped ribs.

In an embodiment, the intake conveyor is pivotable about a third horizontal axis defined by a third horizontal pivot pin spaced upwardly from the lower end of the main conveyor, wherein a range of movement of the intake conveyor relative to the third horizontal pivot axis is 40°. In an embodiment, the lower end of the main conveyor defines a stop limiting downward movement of the intake conveyor by abutting a bottom of the intake conveyor as the intake conveyor is pivoted downwardly. In an embodiment, the stop is defined by a notch at the lower end of the main conveyor and is configured to prevent the intake conveyor from being tilted at a steeper angle than the main conveyor. In an embodiment, the third horizontal axis is aligned with an axis of rotation of the intake roller at the distal end of the tray. In an embodiment, the intake conveyor includes an intake conveyor handle having a bar outwardly spaced from and extending around a periphery of the intake hopper and a plurality of ribs extending from the bar to the tray.

In an embodiment, the lift-assist assembly includes a lift spring connected between the lower end of the main conveyor and a bottom of the intake conveyor at a slight angle relative to the intake conveyor. In an embodiment, the lift spring is held in compression between the main conveyor and the intake conveyor to exert a force with an upward component. In an embodiment, the lift-assist assembly is disposed within a hollow lift-assist arm, and wherein the lift-assist arm includes a C-channel with a bottom and sides. In an embodiment, the lift-assist arm is pivotable about a fourth horizontal axis defined by a fourth horizontal pivot pin at the lower end of the main conveyor and the lift-assist arm is connected to the intake conveyor by a linear coupling. In an embodiment, the linear coupling includes a pin in a linear slot formed in the lift-assist arm and the pin is movable in the linear slot as the intake conveyor is pivoted upwardly and downwardly. In an embodiment, the latch mechanism includes a latch handle connected to a rotatable shaft extending through the linear slot, a latch with teeth mounted on the rotatable shaft, and a plurality of notches formed on an interior of the lift-assist arm and operable to receive the teeth of the latch when the latch handle is rotated to a latched position of the latch mechanism. In an embodiment, the latch mechanism is engageable in a latched position by rotating the latch handle in a first direction and disengageable by rotating the latch handle in a second direction. In an embodiment, the teeth are tapered to allow the intake conveyor to ratchet up to the desired position and then hold the intake conveyor in place. In an embodiment, the lift-assist assembly includes a latch spring operable to bias the latch towards engagement.

In an embodiment, the seed carrier also includes a support roller mounted on a roller arm coupled to the frame and to the conveyor support arm by a linkage. In an embodiment, the support roller is operable to keep the intake conveyor at a constant angle relative to the ground as the main conveyor is raised. In an embodiment, the support roller is positioned to engage a bottom of the lift-assist arm in an unload position and is rollable linearly along the bottom of the lift-assist arm as the main conveyor is moved vertically. In an embodiment, the intake conveyor includes an adjustable baffle assembly operable to control a rate at which seed is discharged from the intake conveyor to the main conveyor. In an embodiment, the baffle assembly includes a baffle plate movable across an opening between the intake conveyor and the main conveyor and an adjustment mechanism configured to releasably hold the baffle plate in a desired position. In an embodiment, the adjustment mechanism of the baffle assembly includes a slot and a thumb screw extending through the slot into a threaded hole in the intake conveyor, wherein the baffle plate is movable vertically to adjust the size of the opening when the thumb screw is loosened. In an embodiment, the main conveyor includes a window. In an embodiment, the window is located on a top side of the main conveyor downstream from the baffle assembly. In an embodiment, the window is located 12" from the baffle assembly.

BRIEF DESCRIPTION OF DRAWINGS

FIG. 4 is a perspective view of a conveyor according to an embodiment of the present invention.

FIG. 5 is an enlarged perspective view of the intake end of the conveyor showing detail A in FIG. 4.

DETAILED DESCRIPTION

Figure 1:
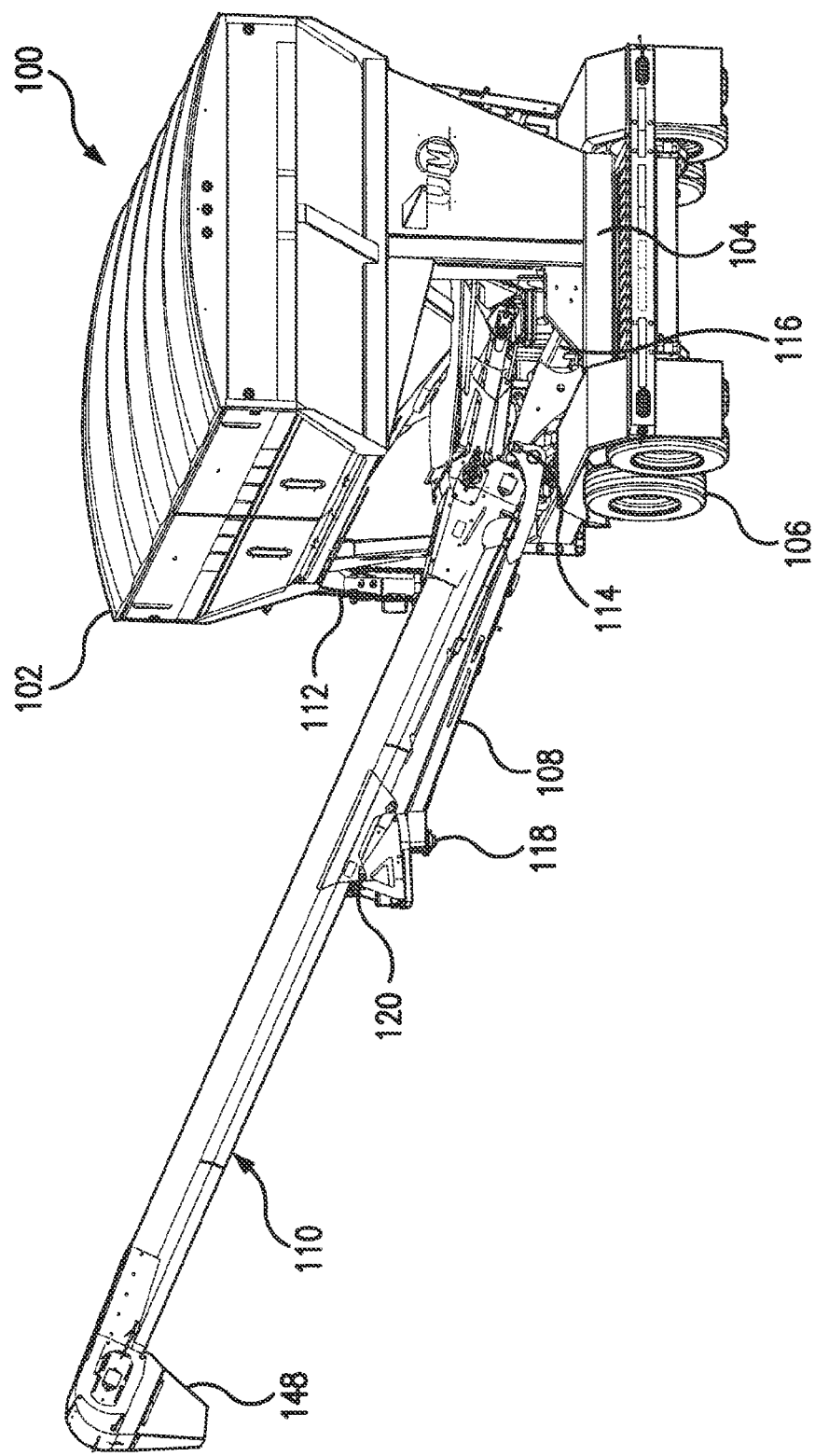
FIG. 1 is a perspective view, from the rear, of a seed carrier with a pivoting conveyor according to an embodiment of the present invention showing the conveyor in an unloading position.
Figure 2:
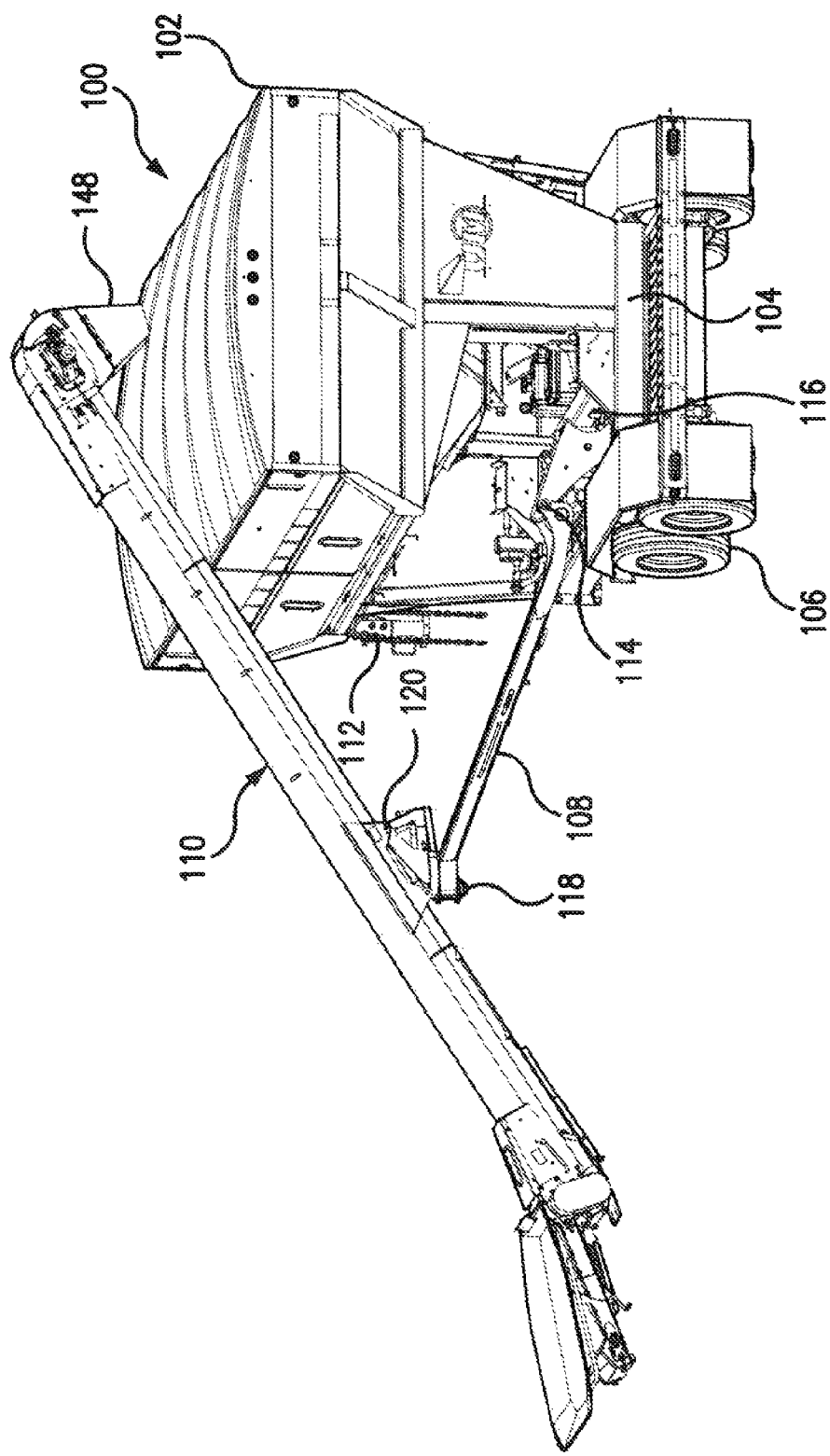
FIGS. 2 and 3 are perspective views, from the rear, of a seed carrier with a pivoting conveyor according to an embodiment of the present invention showing the conveyor in a self-loading position.
Figure 3:
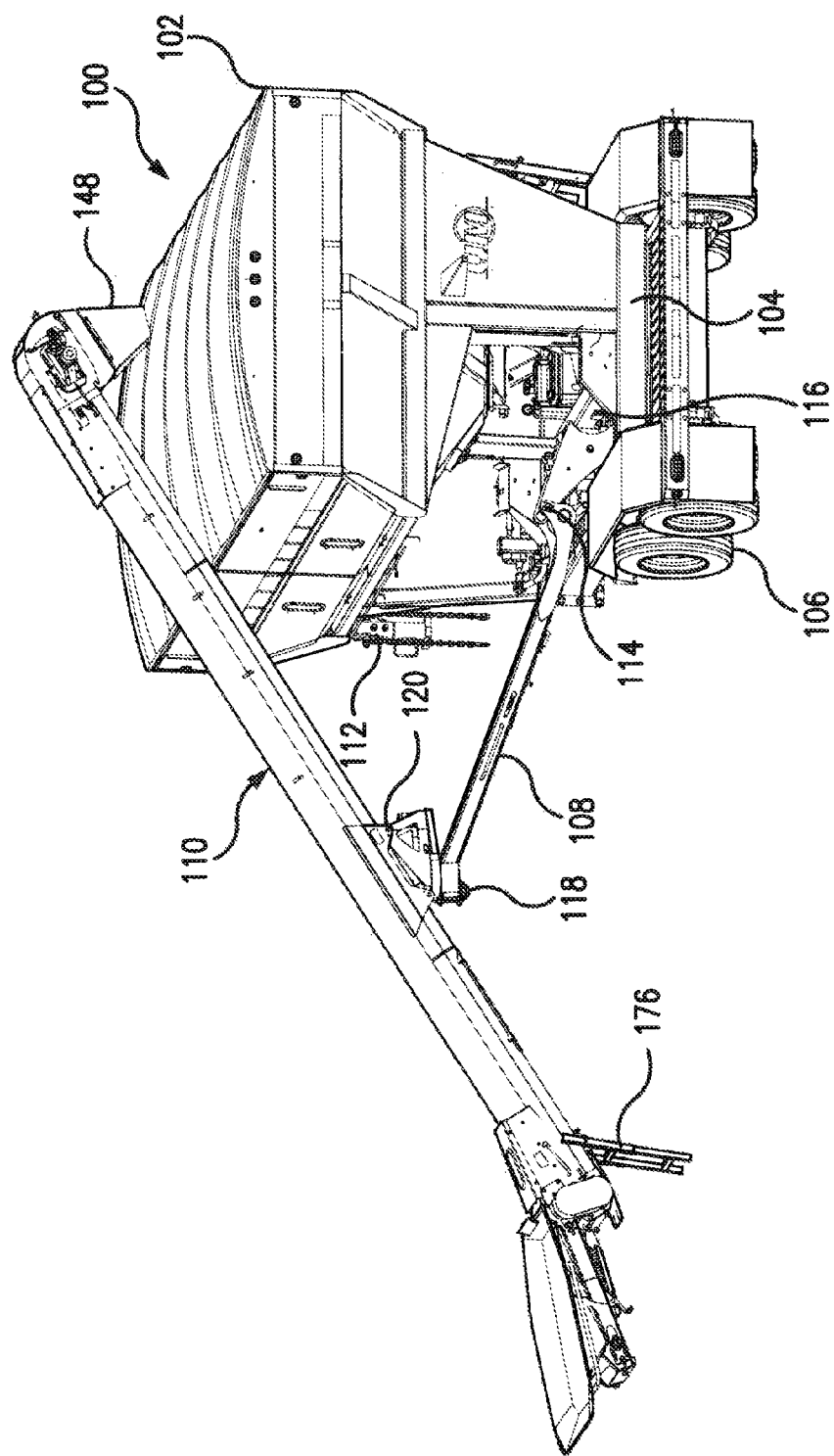
Figure 6:
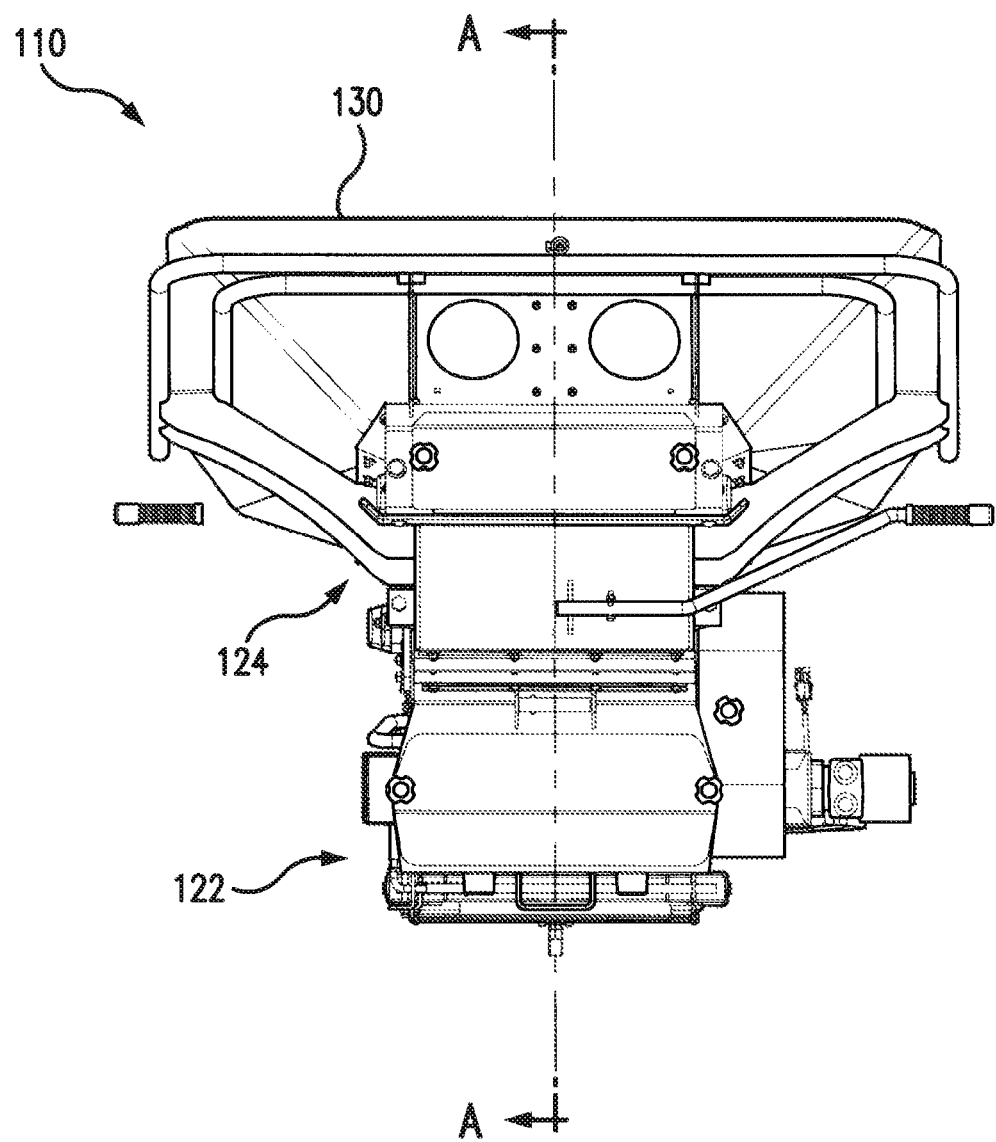
FIG. 6 is an end view of a conveyor for a seed carrier according to an embodiment of the present invention, looking from an intake end of the conveyor towards a discharge end of the conveyor.

FIGS. 1-3 show a seed carrier 100 according to an embodiment of the present invention. The seed carrier 100 includes a main hopper, bin or container 102 mounted on a frame 104 supported by wheels 106, a support arm 108 extending upwardly from the frame, and a conveyor 110 mounted on the support arm. The support arm 108 is pivotable relative to the frame 104, and the conveyor 110 is pivotable relative to the support arm between self-loading and unloading positions, as described in greater detail below.

A hitch assembly 112 extends forwardly from the frame 104 for attachment to a tractor, so that the seed carrier can be towed behind the tractor.

Referring still to FIGS. 1-3, it can be seen that the support arm 108 is an elongate member having a first/lower end pivotally coupled to the frame 104 and a second/upper end pivotally coupled to the conveyor 110. The support arm 108 is pivotable about a first horizontal axis defined by a pivot 114 at or near the lower end of the support arm so that the upper end of the support arm can move upwardly and downwardly relative to the frame 104. The support arm 108 is also pivotable about a first vertical axis defined by a pivot 116 at or near the lower end of the support arm so that, when the support arm extends laterally from one side of the frame 104 as shown, the upper end of the support arm can swing forwardly and rearwardly relative to the frame.

Referring still to FIGS. 1-3, the conveyor 110 includes a lower/intake end and an upper/discharge end. The upper end of the support arm is pivotally coupled to the conveyor between the intake and discharge ends, preferably at or near a center of gravity of the conveyor. The conveyor is pivotable relative to the second end of the support arm about a second vertical axis so that the conveyor can be pivoted between an unloading position (FIG. 1) and a self-loading position (FIGS. 2 and 3). In the embodiment shown, the second vertical axis is defined by a pivot 118 at or near the upper end of the support arm. In an embodiment, the conveyor may also be pivotable about a second horizontal axis defined by a pivot 120 at or near the center of gravity of the conveyor.

Referring now to FIGS. 4 and 5, it can be seen that the conveyor 110 includes a main conveyor 122 and an intake conveyor 124. The intake conveyor 124 is at the lower/intake end of the conveyor 110 and the main conveyor 122 extends upwardly from the intake conveyor to the upper/discharge end of the conveyor. The intake conveyor 124 includes a tray 126 pivotally coupled to a lower end of the main conveyor, an intake belt conveyor (shown in FIGS. 7-8 at 128) disposed within the tray, and an intake hopper 130 that funnels grain from a seed truck or other source onto the belt conveyor in the tray. The intake conveyor 124 is pivotably coupled to the main conveyor 122 via pivots 132 at the lower end of the main conveyor 122. As a result, the intake conveyor 124 can be pivoted relative to the lower end of the main conveyor 122 and oriented at a different angle. For example, the intake conveyor 124 can be pivoted such that the main conveyor 122 is oriented at a steeper angle than the intake conveyor 124, as shown in FIGS. 4 and 5. As will be appreciated from the description that follows, the addition of a pivoting intake conveyor 124 expands the functionality and capabilities of the seed carrier.

Referring now to FIGS. 6-9, it can be see that the main conveyor 122 includes a belt conveyor 134 disposed within an elongate tubular housing 136. The belt 140 conveyor 134 includes rollers 138 at upper and lower ends of the housing 136 and a continuous belt looped around the rollers. The conveyor belt 140 is shown with cleats 142 on an outer surface to help convey seed through the main conveyor 122 when it is oriented at relatively steep angles relative to the ground. In an embodiment, the cleats 142 each extend across the width of the belt 140 and are longitudinally spaced from one another. Intake and discharge openings are formed at lower and upper ends of the tubular housing 136, respectively. The discharge opening (FIG. 4 at 146) at the upper end of the housing is disposed below the upper end of the conveyor belt to discharge seed from the main conveyor 122. A discharge spout (see FIGS. 1-3 at 148) may be mounted at the discharge opening to funnel seed discharged from the main conveyor 122 in a desired direction (e.g., downwardly). The intake opening 144 at the lower end of the main conveyor housing is disposed above the lower end of the main conveyor belt 140 in communication with the intake conveyor 124 and is positioned to receive seed from the intake conveyor belt 128.

As noted above, the intake conveyor 124 includes a tray 126 pivotally coupled to a lower end of the main conveyor 122, and an intake belt conveyor 150 is disposed within the tray. As best seen in FIGS. 6-9, the intake belt conveyor 150 includes a roller 152 proximate the intake opening 144 at the lower end of the main conveyor 122 and a roller 153 at an opposite/distal end of the tray. A continuous intake belt 128 is looped around the intake rollers 152, 153 to transfer seed from the tray 126 to the main conveyor. In an embodiment, the intake belt conveyor 150 includes a belt with less aggressive/smaller surface features than the main belt, such as a so-called crescent belt having a pattern of crescent-shaped ribs disposed at spaced intervals across the length and width of the belt. Alternatively, the intake belt may have surface features such as chevron-shaped ribs. In an embodiment, the surface features on the intake belt are shorter and more closely spaced than the surface features on the main belt.

Figure 9:
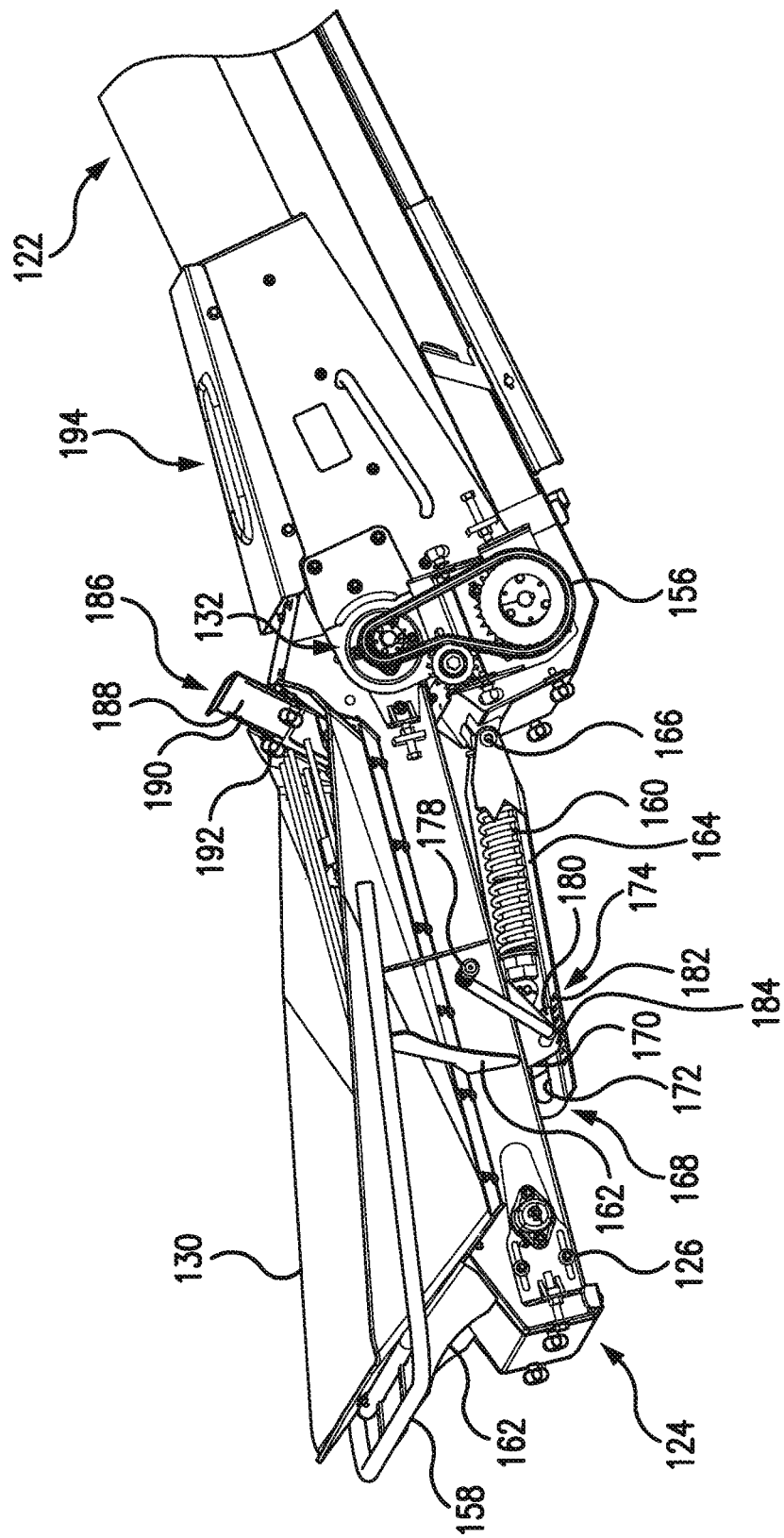
FIG. 9 is a perspective view, partly in section, of the intake end of a conveyor according to an embodiment of the present invention.
Figure 10:
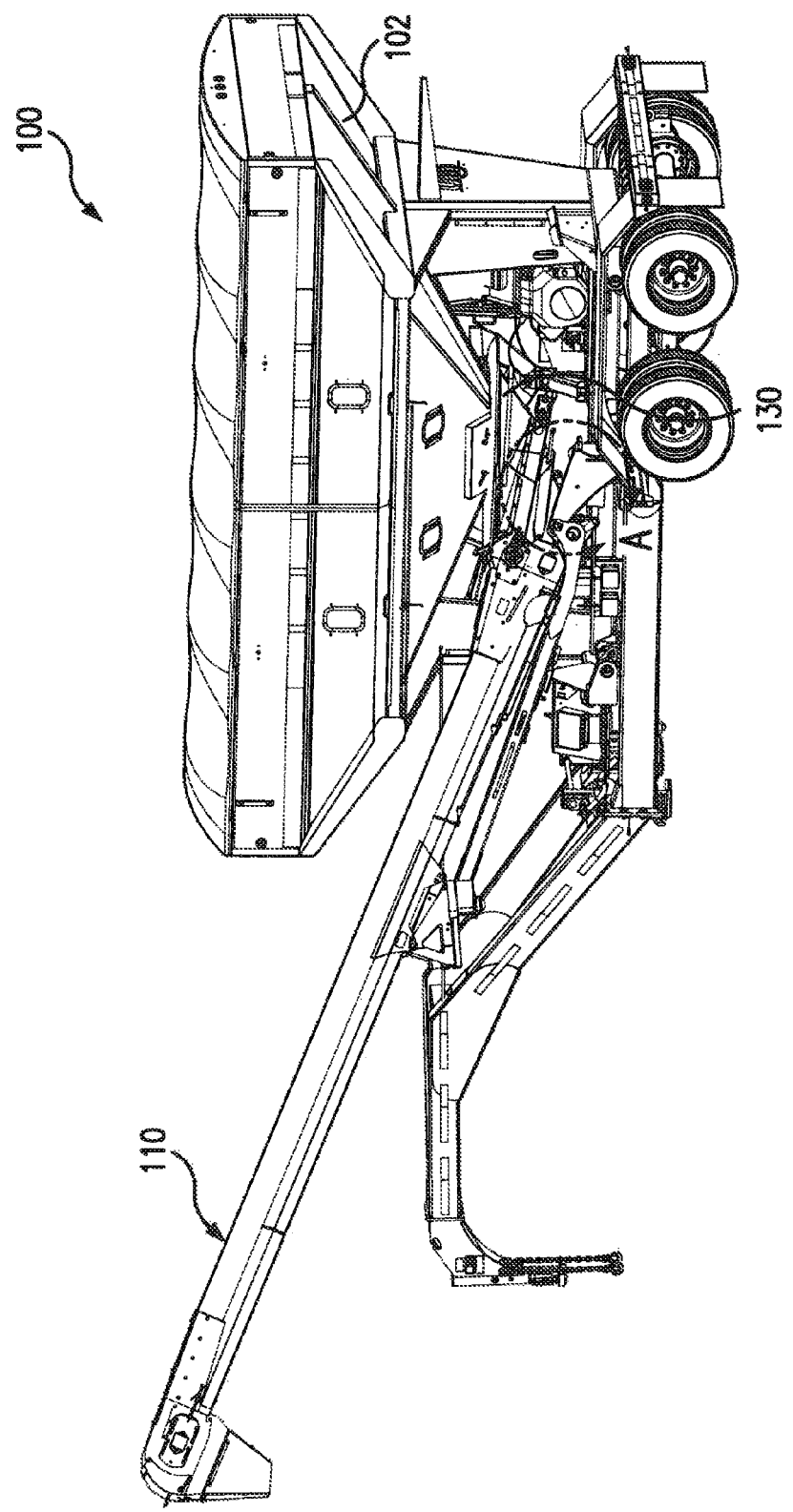
FIG. 10 is a perspective rear view of a seed carrier according to an embodiment of the present invention in an unloading position in which the conveyor is in a lowered position.
Figure 11:
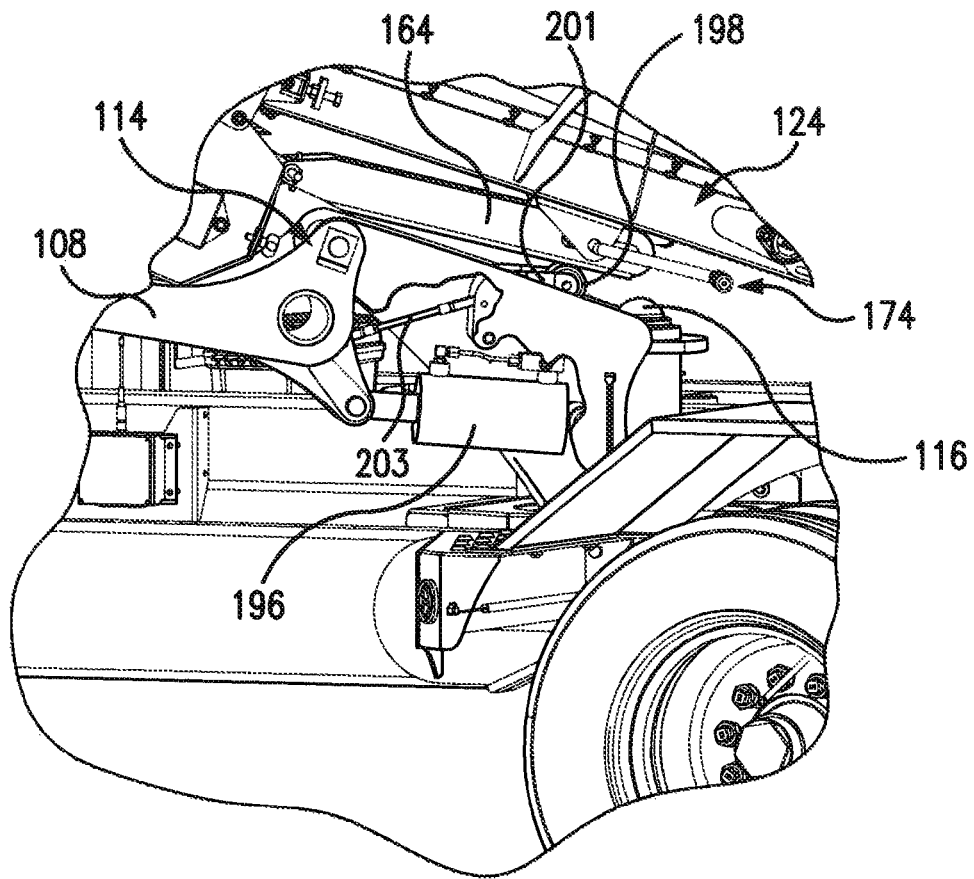
FIG. 11 is an enlarged view of the intake end of the conveyor showing detail A in FIG. 10.
Figure 12:
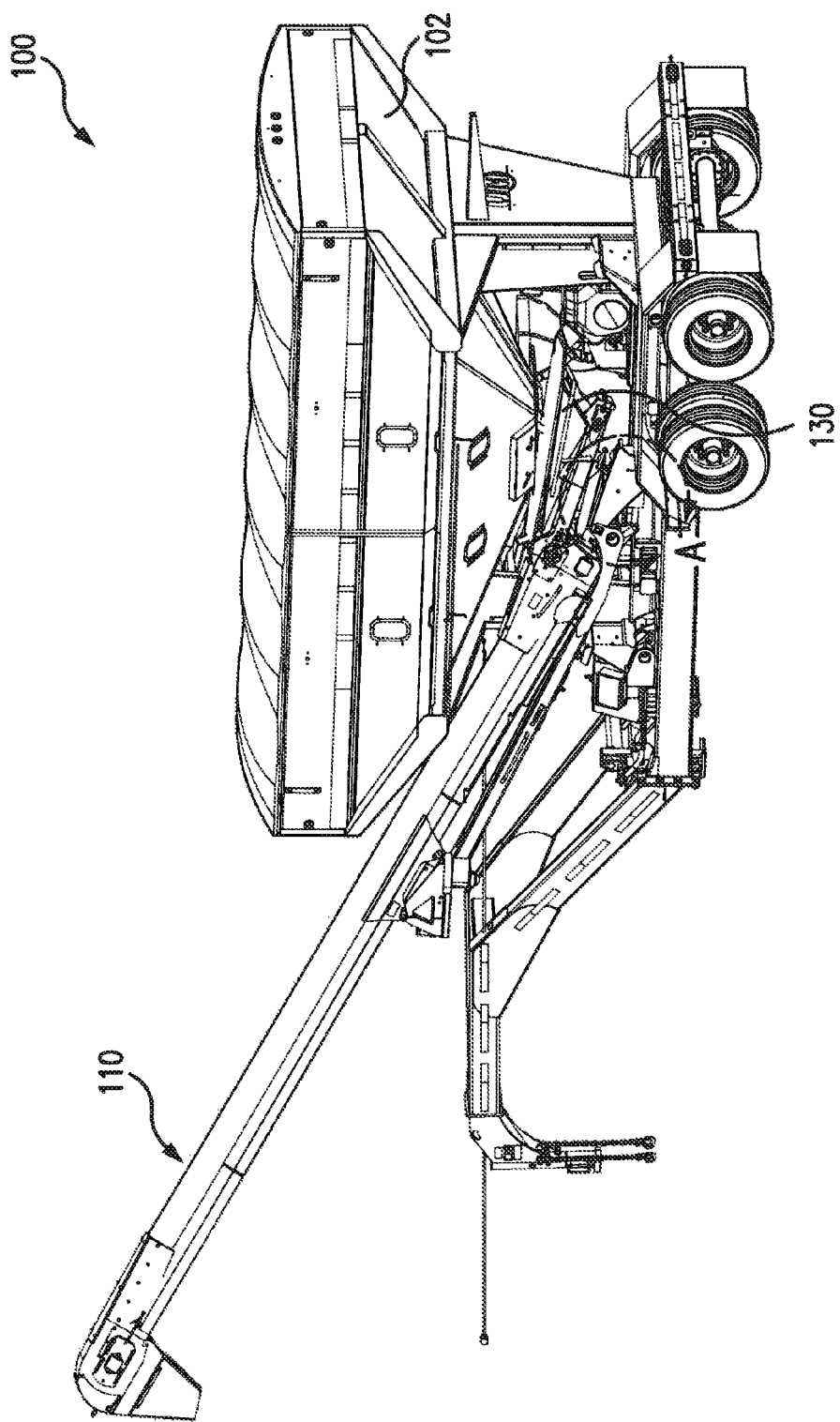
FIG. 12 is a perspective rear view of a seed carrier according to an embodiment of the present invention in an unloading position in which the conveyor is in an elevated or raised position.
Figure 13:
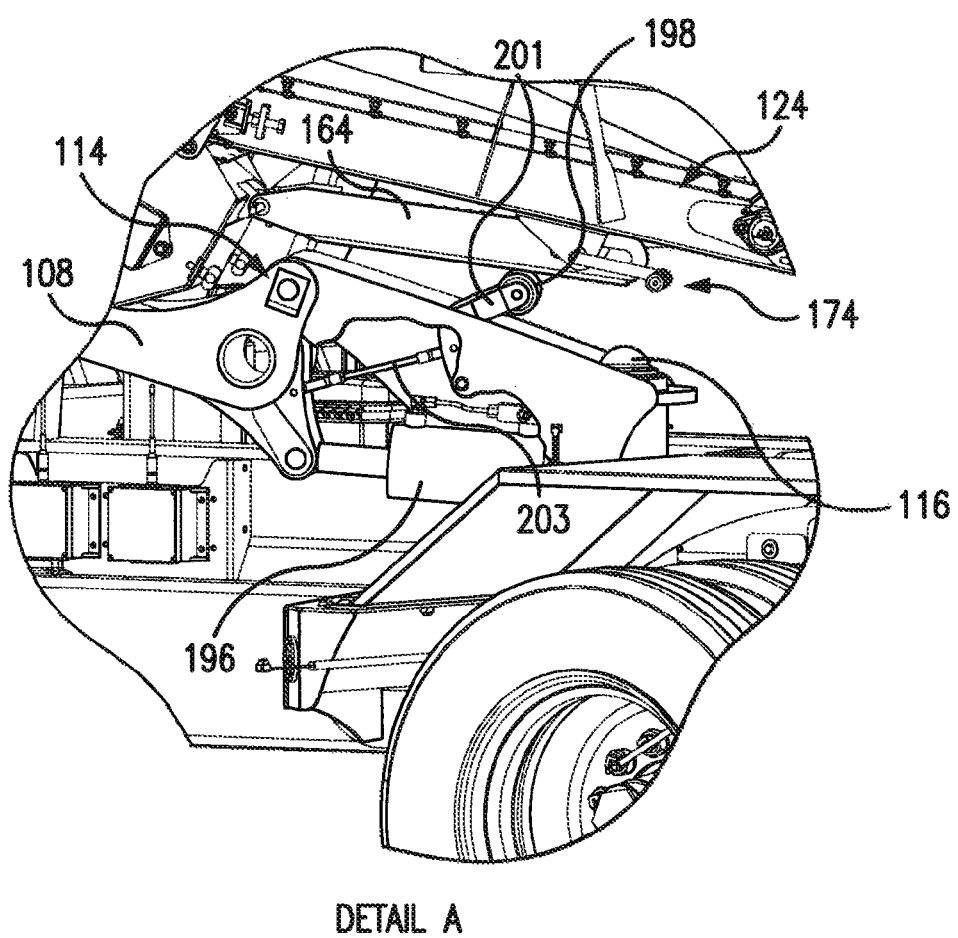
FIG. 13 is an enlarged view of the intake end of the conveyor showing detail A in FIG. 12.

In an embodiment, the intake conveyor tray 126 is coupled to the main conveyor 122 at pivots that allow the intake conveyor 124 to pivot up and down about a third horizontal axis in relation to the main conveyor. In an embodiment, the range of movement is 40°. In an embodiment, the third horizontal pivot axis (FIG. 4 at 132) is spaced upwardly from the lower end of the main conveyor 122 so that the lower end of the main conveyor defines a stop 154 limiting downward movement of the intake conveyor 124 by abutting a bottom of the intake conveyor as it is pivoted downwardly. In an embodiment, the stop 154 is defined by a notch at the lower end of the main conveyor. In an embodiment, the stop 154 is configured to prevent the intake conveyor from being tilted at a steeper angle than the main conveyor. In an embodiment, the third horizontal pivot axis (FIG. 4 at 132) is aligned with the axis of rotation of the intake roller 152 at the intake opening 144 in the main conveyor 122. That is, the pivots (FIG. 4 at 132) may be centered around the bearing area of the intake conveyor 124. This allows a direct chain drive from the main conveyor to the intake conveyor, so that the intake conveyor may be powered by the same power source as the main conveyor, e.g., as shown in FIG. 9. In an embodiment, the power source may be the PTO on a tractor. Alternatively, the intake conveyor 124 could include its own hydraulic or electric motor and be driven independent of the main conveyor. In an embodiment, the intake roller 152 nearest the main conveyor is spaced above the main roller 138 at the lower end of the main conveyor 122. As a result, the terminal end of the intake belt conveyor 150 is always disposed above the main belt conveyor 150 so that seed from the intake belt conveyor 134 is fed to the main belt conveyor via gravity.

As best seen in FIG. 9, the intake conveyor 124 can be provided with a handle 158 and a spring-lift assist 160, such as a compression spring or gas spring, can be connected between the main conveyor 122 and the intake conveyor 124 to counterbalance the weight of the intake conveyor and allow the intake conveyor to be pivoted up and down manually by an operator with minimal effort. In an embodiment, the intake conveyor handle 158 includes a bar outwardly spaced from and extending around an upper periphery of the intake hopper 130 and a plurality of ribs 162 extending downwardly from the bar 158 to the tray 126. In an embodiment, the spring-lift assist 160 is connected between the lower end of the main conveyor 122 and the bottom of the intake conveyor 124 at a slight angle relative the intake conveyor to provide a lifting force almost equal to a weight of the intake conveyor, so that the intake conveyor is still slightly biased downwardly but easily pivoted by an operator in either an upwardly or downwardly direction in a controlled manner using the intake conveyor handle 158. In an embodiment, the spring-lift assist 160 is disposed within a hollow spring assist arm 164. In an embodiment, the spring assist arm 164 can include a C-channel with bottom and sides. In an embodiment, the spring assist arm 164 is connected to the main conveyor 122 at one end by a pivot 166 defining a fourth horizontal pivot axis and at an opposite end by a linear coupling 168, such as a pin 170 riding in a slot 172. For example, in FIG. 9, a linear slot 172 is formed in the arm 164, and a pin 170 carried by the intake conveyor 124 moves back and forth within the slot as the intake conveyor is pivoted upwardly and downwardly.

In an embodiment, a latch mechanism 174 can be provided to maintain the intake conveyor 124 at a desired pivot angle in relation to the main conveyor 122. For example, when resting the conveyor 110 on a support stand 176 as shown in FIG. 3, the inventors have found that it is desirable to maintain the intake conveyor 124 in a horizontal, or nearly horizontal, orientation. The latch mechanism 174 can be used to hold the intake conveyor in such desired orientation. In an embodiment, the latch mechanism 174 includes a latch handle 178 connected to a rotatable shaft (e.g., pin 170) extending through the slot 172 in the spring assist arm 164, a latch 180 with teeth mounted on the shaft, and a plurality of notches 182 formed on an interior of the spring assist arm to receive the teeth of the latch when the latch handle is rotated to a latched position. In an embodiment, the shaft extends through tabs 184 extending downwardly from the intake conveyor 124 on opposite sides of the spring assist arm 164 and serves a dual function as a pin 170 in the arm slot 172 when the latch is disengaged.

To engage the latch, the latch handle 178 is rotated (e.g., clockwise in FIG. 9) to cause the teeth on the latch 180 to engage the notches 182 inside the arm 164. The teeth are preferably tapered to allow the intake conveyor 124 to ratchet up to the desired position, and then hold the intake conveyor in place. In an embodiment, gravity can be used to bias the latch towards engagement, but a spring could also be used. When the latch is not desired, the latch handle 178 can be rotated in the opposite direction (e.g., counter-clockwise in FIG. 9) and held, by gravity, in a disengaged position allowing the intake conveyor 124 to pivot up and down freely.

Referring still to FIG. 9, the intake conveyor 124 may include an adjustable gate or baffle mechanism 186 to control the rate at which seed is discharged from the intake conveyor into the main conveyor 122. This feature is advantageous when the main conveyor 122 is operating at a steeper angle (relative to the ground) than the intake conveyor 124. A steep angle on the main conveyor 122 reduces the capacity of the conveyor, while the intake conveyor 124 remains horizontal or nearly horizontal with a constant capacity. The adjustable gate mechanism 186 makes it possible to meter the flow of material from the intake conveyor 124 to the main conveyor 122.

Figure 7:
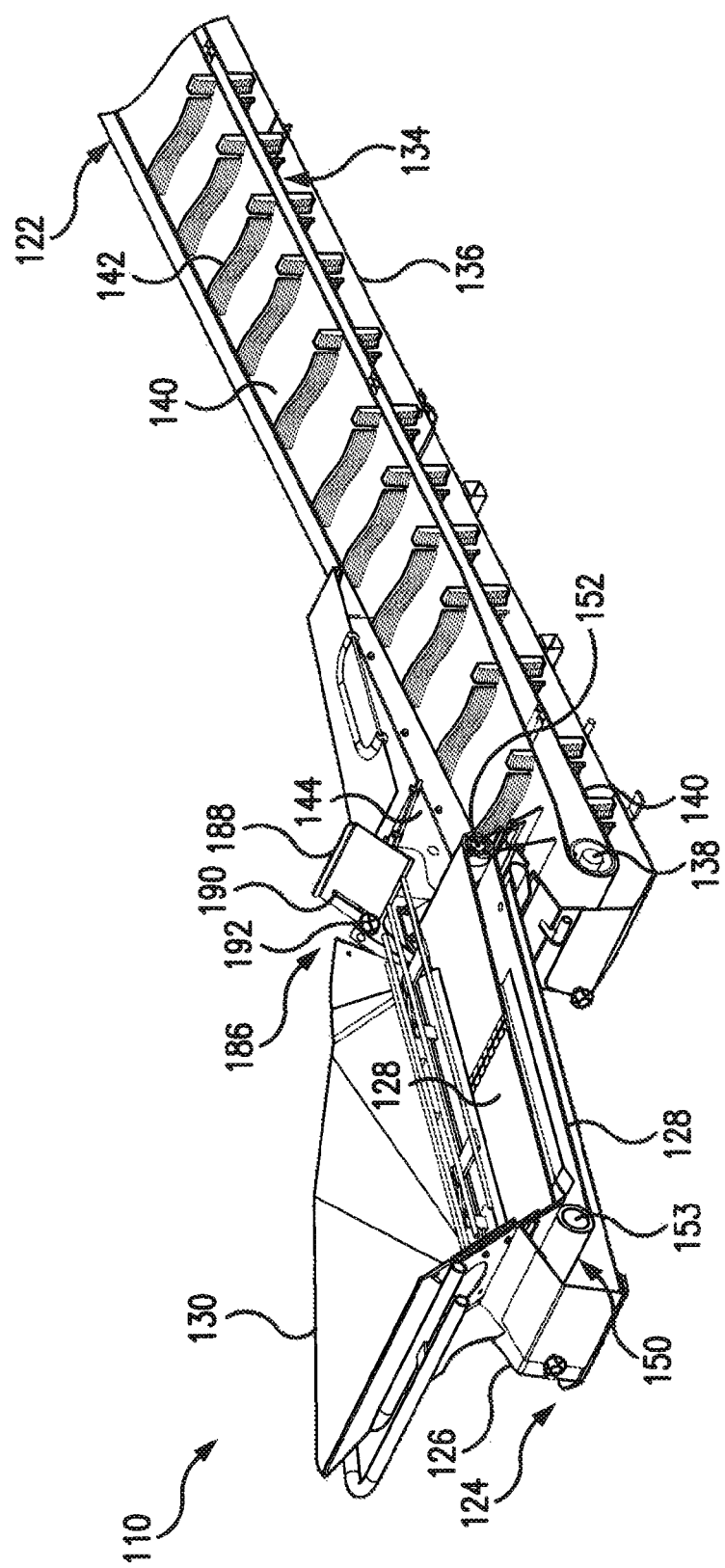
FIG. 7 is a cross-sectional perspective view of the intake end of the conveyor, taken through line A-A in FIG. 6.
Figure 8:
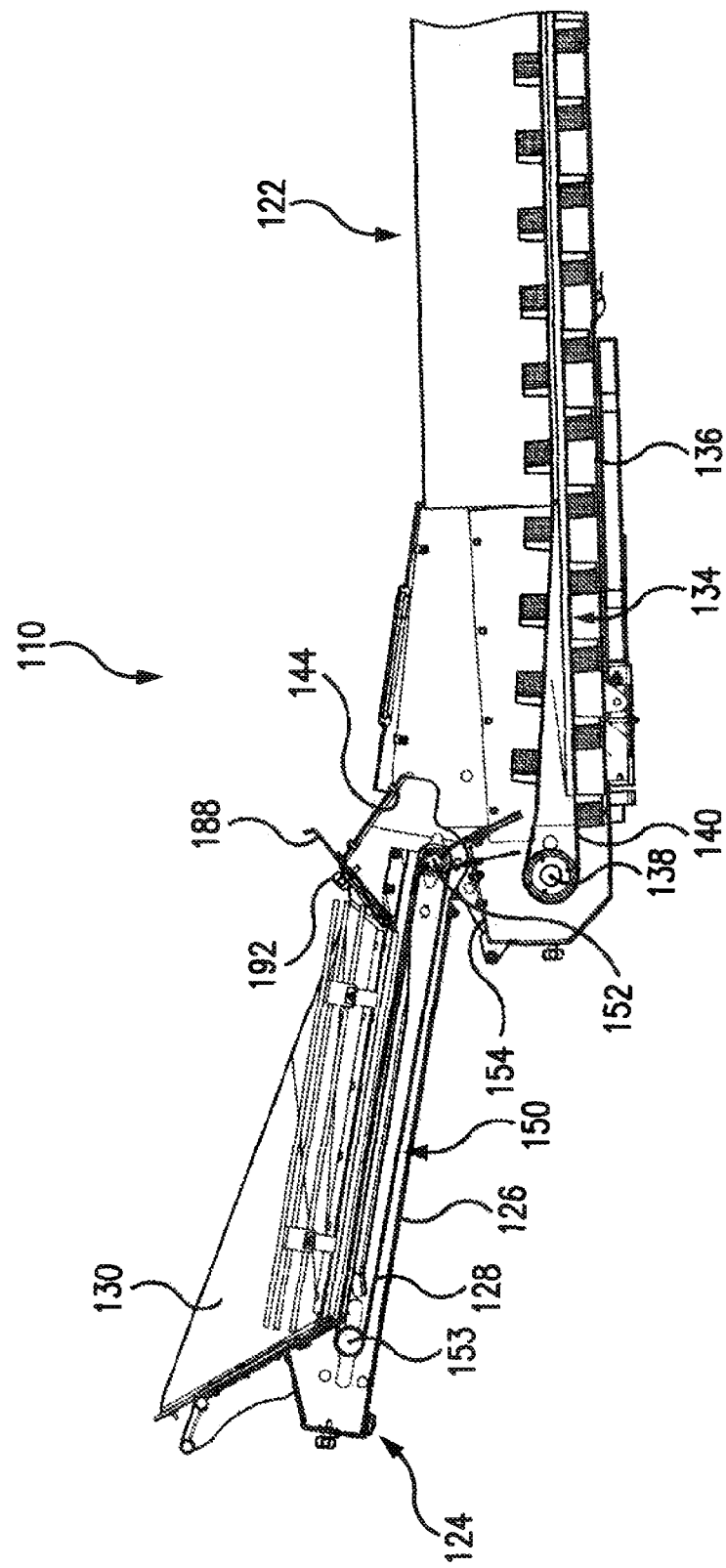
FIG. 8 is a cross-sectional side view of the intake end of the conveyor, taken through line A-A in FIG. 6.

Referring to FIGS. 7-9, the adjustable gate 186 includes a plate 188 movable across the opening between the intake conveyor 124 and the main conveyor 122. The plate includes a slot 190 and a thumb screw 192 extending through the slot into a threaded opening in the intake conveyor. When the thumb screw 192 is loosened, the plate 188 can be moved up or down to increase or decrease the size of the opening through which seed is conveyed. When a desired opening size is achieved, the thumb screw 192 can be tightened to hold the plate 188 in place, thereby fixing the discharge opening. To assist the user in adjusting the gate 186, a window 194 may be provided in the main conveyor 122 downstream of the intake conveyor 124 to permit the user to visualize seed in the main conveyor. The window 194 is preferably located on a top side of the main conveyor 122 a short distance (e.g., 12") from the adjustable gate 186 so that the user can observe seed in the main conveyor while adjusting the gate. The window 194 may be formed of glass or plastic or any other suitable material.

Referring now to FIGS. 10-13, the seed carrier 100 according to the present invention is shown with the conveyor 110 pivoted into the unload position, where the intake conveyor hopper 130 is located below the discharge of the main hopper 102. As noted previously, the conveyor 110 is affixed to a support arm 108 with a horizontal pivot point 114. A hydraulic lift cylinder 196 is used to raise and lower the conveyor 110. In the embodiment shown, a support roller 198 is coupled to the frame 104 to engage the intake conveyor 124 in the unload position and maintain the intake conveyor in a desired orientation, such as a horizontal or nearly horizontal orientation, with the latch 174 is disengaged. In an embodiment, the support roller 198 is mounted on a roller arm 201 coupled to the conveyor support arm 108 by a linkage 203 such that, as the main conveyor 122 is raised, the support roller 198 pushes up to keep the intake conveyor 124 at a constant angle in relation to the ground. This acts to maintain a uniform capacity of the intake conveyor 124. Without this, the angle of incline on the intake conveyor 124 could become too great and the flow of material on the intake conveyor belt could be greatly reduced. In an embodiment, the roller 198 is positioned to engage a bottom of the gas assist arm 164 in the unload position and to roll linearly along the bottom of the arm as the main conveyor 122 is raised (FIGS. 12 and 13) and lowered (FIGS. 10 and 11) while in the unload position.

Figure 14:
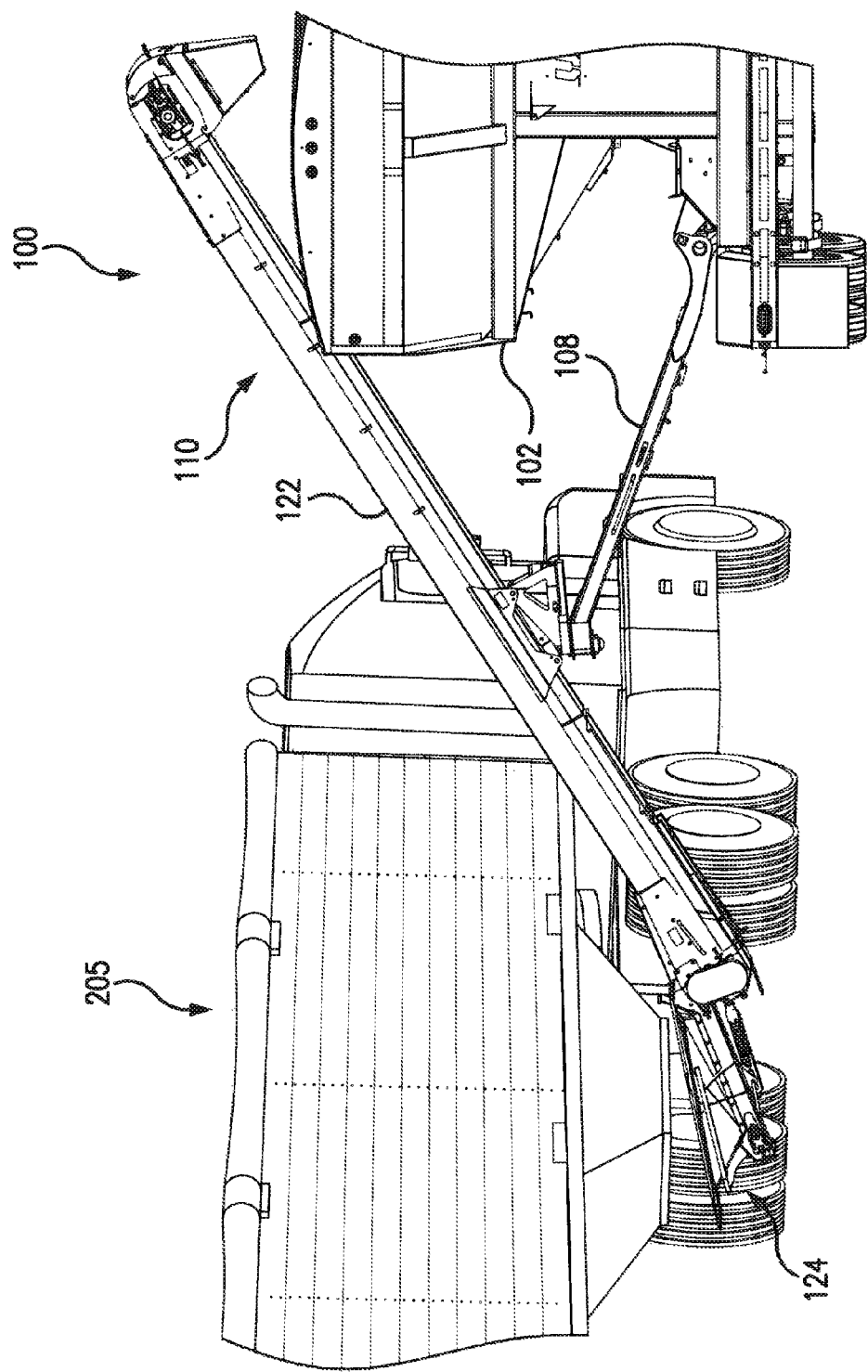
FIG. 14 is a photograph of a seed carrier according to an embodiment of the present invention in a loading position in which the intake end of the conveyor is positioned beneath a semi-trailer to transfer seed from the semi-trailer directly to the seed carrier.

It will be appreciated that the present invention allows the main conveyor 122 to be positioned on an incline to lift the seed into the seed carrier, while the intake conveyor 124 can remain horizontal or nearly horizontal to create a larger, lower profile intake for the conveyor 110. This is an advantage when trying to reach under low-profile vehicles, such as when transferring grain or seed from a semi-trailer seed delivery truck 205, into the seed carrier 100, e.g., as shown in FIG. 14. The intake conveyor 124 uses its own belt which transfers grain into the hopper end of the main conveyor 122, and then the main conveyor takes the grain up into the main hopper 102 of the seed carrier 100. A series of brush and rubber seals can be used in the transition area between the discharge of the intake conveyor 124 and the intake of the main conveyor 122 to ensure the grain transfers without falling into the back side of the belt.

In the self-loading position (FIGS. 2, 3, and 14), the intake end 124 is spaced away from the container 102 to receive seed from a delivery truck or storage bin and the discharge end 146 is located above the container 102 to dispense the seed into the container 102. In the unloading position (FIG. 1), the intake end 124 is located beneath the container 102 to receive seed from the container and the discharge end 146 is spaced away from the container 102 to dispense the seed into a planter, drill, or some other farm implement disposed alongside or near the seed carrier.

Thus, an exemplary embodiment of a seed carrier according to the present invention has been described with reference to the drawing figures. Although the invention has been described based upon an exemplary embodiment, it will be apparent to those of skill in the art that certain modifications, variations, and alternative constructions can be made to the described embodiment within the spirit and scope of the invention. For example, while various pivot axes are described as being "vertical" or "horizontal," it will be appreciated that such vertical pivot axes may be generally vertical (i.e., more vertical than horizontal) and such horizontal pivot axes may be generally horizontal (i.e., more horizontal than vertical), relative to a level surface. Also, while the exemplary embodiment includes wheels, it will be appreciated that tracks can be used. It will also be appreciated that the main conveyor and the intake conveyor may be driven by the power take-off (PTO) on the tractor, by a motor on the seed tender, or by some combination of the foregoing (e.g., main conveyor powered by the PTO and intake conveyor powered by an onboard motor). Also, while hydraulic cylinders are disclosed for controlling movement of pivoting members, such as the support arm and the intake conveyor, it will be appreciated that other types of actuators can be used, such as electric servo motors, pneumatic cylinders, springs, etc. The coupling at the first end of the support arm may include a pivoting base, a turntable, or any other pivoting coupling that defines a vertical pivot axis.

The invention claimed is:

1. A seed carrier comprising:
a frame;
a main hopper mounted to the frame;
a support arm extending upwardly in relation to the frame, the support arm having a lower end and an upper end and being pivotable at or near the lower end of the support arm about a first horizontal axis so that the upper end of the support arm is movable upwardly and downwardly relative to the frame;
a conveyor coupled to the support arm, the conveyor having an intake end and a discharge end and being pivotable at or near the center of gravity of the conveyor about a second horizontal axis relative to the support arm between a self-loading position and an unloading position, the conveyor further including:
a main conveyor having a lower end and an upper end; and
an intake conveyor pivotally connected to the lower end of the main conveyor;
a lift-assist assembly coupled between the main conveyor and the intake conveyor, the lift-assist assembly applying a force with an upward component to the intake conveyor at a position spaced from the pivot, whereby the weight of the intake conveyor is counterbalanced so as to render the intake conveyor manually pivotable; and
a latch mechanism coupled to at least one of the intake conveyor and the main conveyor.

2. The seed carrier of claim 1, wherein the latch mechanism is coupled to the intake conveyor and the main conveyor via the lift-assist assembly.

3. The seed carrier of claim 1, wherein the latch mechanism includes a latch movable between an engaged position wherein the latch engages the lift-assist assembly to maintain the intake conveyor in a desired orientation relative to the main conveyor and a disengaged position wherein the latch is disengaged from the lift-assist assembly so that the intake conveyor can pivot relative to the main conveyor.

4. The seed carrier of claim 1,
wherein the main conveyor includes an elongate tubular housing having an intake end and a discharge end and a main belt conveyor assembly disposed within the elongate tubular housing,
wherein the intake end of the housing is disposed above the lower end of the main conveyor in communication with the intake conveyor, the main belt conveyor assembly including main conveyor rollers at the upper and lower ends of the housing and a continuous main conveyor belt looped around the main conveyor rollers, and
wherein the intake conveyor includes a tray pivotally coupled to the lower end of the main conveyor, an intake belt conveyor assembly disposed within the tray, and an intake hopper.

5. The seed carrier of claim 4, wherein the intake conveyor is pivotally coupled to the main conveyor via intake pivots at the lower end of the main conveyor, and wherein the intake belt conveyor assembly includes intake rollers proximate the lower end of the main conveyor and at a distal end of the tray and a continuous intake belt is looped around the intake rollers.

6. The seed carrier of claim 5, wherein the intake belt and the main conveyor belt include surface features, and wherein the surface features of the intake belt are smaller than the surface features of the main conveyor belt.

7. The seed carrier of claim 5, wherein the intake belt and the main conveyor belt include surface features, and wherein the surface features of the intake conveyor belt are shorter and more closely spaced than surface features on the main conveyor belt.

8. The seed carrier of claim 7, wherein the intake conveyor is pivotable about a third horizontal axis defined by a third horizontal pivot pin spaced upwardly from the lower end of the main conveyor and the third horizontal axis is aligned with an axis of rotation of the intake roller at the distal end of the tray.

9. The seed carrier of claim 7, wherein the intake belt includes one or more of:
a crescent belt having a pattern of crescent-shaped ribs disposed at spaced intervals across a length and a width of the intake belt; and
chevron-shaped ribs.

10. The seed carrier of claim 9, wherein the stop is defined by a notch at the lower end of the main conveyor and is configured to prevent the intake conveyor from being tilted at a steeper angle than the main conveyor.

11. The seed carrier of claim 7, wherein the lower end of the main conveyor defines a stop limiting downward movement of the intake conveyor by abutting a bottom of the intake conveyor as the intake conveyor is pivoted downwardly.

12. The seed carrier of claim 5, wherein the intake conveyor is pivotable about a third horizontal axis defined by a third horizontal pivot pin spaced upwardly from the lower end of the main conveyor, wherein a range of movement of the intake conveyor relative to the third horizontal pivot axis is 40°.

13. The seed carrier of claim 4, wherein the intake conveyor includes an intake conveyor handle having a bar outwardly spaced from and extending around a periphery of the intake hopper and a plurality of ribs extending from the bar to the tray.

14. The seed carrier of claim 4, wherein the lift-assist assembly includes a first spring connected between the lower end of the main conveyor and a bottom of the intake conveyor at a slight angle relative to the intake conveyor.

15. A seed carrier comprising:
a frame;
a main hopper mounted to the frame;
a support arm extending upwardly in relation to the frame, the support arm having a first end and a second end;
a conveyor coupled to the support arm, the conveyor having an intake end and a discharge end and being pivotable relative to the support arm between a self-loading position and an unloading position, the conveyor further including:
a main conveyor having a lower end and an upper end; and
an intake conveyor pivotally connected to the lower end of the main conveyor;
a lift-assist assembly coupled between the main conveyor and the intake conveyor, the lift-assist assembly applying a force with an upward component to the intake conveyor at a position spaced from the pivot, whereby the weight of the intake conveyor is counterbalanced so as to render the intake conveyor manually pivotable; and
a latch mechanism coupled to at least one of the intake conveyor and the main conveyor,
wherein the main conveyor includes an elongate tubular housing having an intake end and a discharge end and a main belt conveyor assembly disposed within the elongate tubular housing,
wherein the intake end of the housing is disposed above the lower end of the main conveyor in communication with the intake conveyor, the main belt conveyor assembly including main conveyor rollers at the upper and lower ends of the housing and a continuous main conveyor belt looped around the main conveyor rollers, and
wherein the intake conveyor includes a tray pivotally coupled to the lower end of the main conveyor, an intake belt conveyor assembly disposed within the tray, and an intake hopper,
wherein the lift-assist assembly includes a first spring connected between the lower end of the main conveyor and a bottom of the intake conveyor at a slight angle relative to the intake conveyor, and
wherein the lift-assist assembly includes a hollow lift-assist arm, and the first spring is disposed within the hollow lift-assist arm.

16. The seed carrier of claim 15, wherein the lift-assist arm is pivotable about a horizontal axis defined by a horizontal pivot pin at the lower end of the main conveyor and wherein the lift-assist arm is connected to the intake conveyor by a linear coupling, wherein the linear coupling includes a pin in a linear slot formed in the lift-assist arm, wherein the pin is movable in the linear slot as the intake conveyor is pivoted upwardly and downwardly.

17. The seed carrier of claim 15, further comprising a support roller mounted on a roller arm coupled to the frame and to the conveyor support arm by a linkage, wherein the support roller is operable to keep the intake conveyor at a constant angle relative to the ground as the main conveyor is raised.

18. The seed carrier of claim 17, wherein the support roller is positioned to engage a bottom of the lift-assist arm in an unload position and is rollable linearly along the bottom of the lift-assist arm as the main conveyor is moved vertically.

19. The seed carrier of claim 16, wherein the latch mechanism includes a latch handle connected to a rotatable shaft extending through the linear slot, a latch with teeth mounted on the rotatable shaft, and a plurality of notches formed on an interior of the lift-assist arm and operable to receive the teeth of the latch when the latch handle is rotated to a latched position of the latch mechanism.

20. The seed carrier of claim 19, wherein the latch mechanism is engageable in a latched position by rotating the latch handle in a first direction and disengageable by rotating the latch handle in a second direction.

21. The seed carrier of claim 20, wherein the teeth are tapered to allow the intake conveyor to ratchet up to the desired position and then hold the intake conveyor in place.

22. The seed carrier of claim 21, wherein the lift-assist assembly includes a second spring operable to bias the latch towards engagement.

23. The seed carrier of claim 1, wherein the intake conveyor includes an adjustable baffle assembly operable to control a rate at which seed is discharged from the intake conveyor to the main conveyor.

24. The seed carrier of claim 23, wherein the baffle assembly includes a baffle plate movable across an opening between the intake conveyor and the main conveyor and an adjustment mechanism configured to releasably hold the baffle plate in a desired position.

25. The seed carrier of claim 24, wherein the adjustment mechanism of the baffle assembly includes a slot and a thumb screw extending through the slot into a threaded hole in the intake conveyor, wherein the baffle plate is movable vertically to adjust the size of the opening when the thumb screw is loosened.

26. The seed carrier of claim 25, wherein the main conveyor includes a window.

27. The seed carrier of claim 26, wherein the window is located on a top side of the main conveyor downstream from the baffle assembly.

28. The seed carrier of claim 27, wherein the window is located 12" from the baffle assembly.

* * * * *